(12) United States Patent
Okuma et al.

(10) Patent No.: US 7,098,558 B2
(45) Date of Patent: Aug. 29, 2006

(54) STARTING CIRCUIT FOR POWER-CONVERTING APPARATUS

(75) Inventors: Yasuhiro Okuma, Tokyo (JP); Nobuyuki Kobayashi, Tokyo (JP)

(73) Assignee: Fuji Electric Systems Co., Ltd., (JP)

( * ) Notice: Subject to any disclaimer, the term of this patent is extended or adjusted under 35 U.S.C. 154(b) by 47 days.

(21) Appl. No.: 10/930,054

(22) Filed: Aug. 30, 2004

(65) Prior Publication Data

US 2005/0088860 A1    Apr. 28, 2005

(30) Foreign Application Priority Data

Aug. 29, 2003  (JP) ............................ 2003-307125
May 31, 2004   (JP) ............................ 2004-161348

(51) Int. Cl.
    *H02J 9/04*    (2006.01)
(52) U.S. Cl. ...................................... 307/66
(58) Field of Classification Search ............ 307/43–46, 307/48, 64, 66; 363/34, 37, 97, 98, 131, 363/132
    See application file for complete search history.

(56) References Cited

U.S. PATENT DOCUMENTS

| | | |
|---|---|---|
| 4,709,318 A | 11/1987 | Gephart et al. |
| 5,210,685 A | 5/1993 | Rosa |
| 5,440,179 A | 8/1995 | Severinsky |
| 5,619,076 A | 4/1997 | Layden et al. |
| 6,310,787 B1 * | 10/2001 | Ito et al. ........................ 363/34 |
| 6,507,507 B1 * | 1/2003 | Tokunaga et al. ............. 363/89 |

FOREIGN PATENT DOCUMENTS

JP    8-65917 A    3/1996

OTHER PUBLICATIONS

K. Hirachi et al., "Cost-Effective Bidirectional Chopper-based Battery Link UPS with Common Input-Output Bus Line and Its Control Scheme," Industrial Electronics, Control, and Instrumentation, 1996, IEEE, Aug. 5, 1996, pp. 1681-1686, XP010203235, ISBN: 0-7803-2775-6.

* cited by examiner

*Primary Examiner*—Gary L Laxton
(74) *Attorney, Agent, or Firm*—Rossi, Kimms & McDowell, LLP

(57) ABSTRACT

A power-converting apparatus features the ability to achieve initial charging of a smoothing capacitor generating a minimum rush current by obviating the need for additional series connections in a battery, and also obviating the need for an initial charging circuit consisting of a charging resistor and switch in the capacitor. The power-converting apparatus includes a separating device that electrically separates an AC power-supply source from the input devices of the power-converting apparatus, an AC/AC converting circuit that initially rectifies AC current from an AC power-supply source and then causes a capacitor to smooth the rectified AC current, thereby converting the rectified AC current into DC current before again converting the DC current into AC current, a battery; and a DC/DC converting circuit that enables a capacitor to be charged with DC voltage delivered from the battery, and conversely enables the battery to be charged with a DC voltage delivered from the above capacitor bilaterally or unilaterally.

4 Claims, 3 Drawing Sheets

STARTING CIRCUIT FOR POWER-CONVERTING APPARATUS

BACKGROUND

The present invention relates to a starting circuit for starting a main circuit operated to enable the stable supply of AC current from an AC power-supply source used for operating an uninterruptible power-supply source to be supplied to an objective load, and to a method of starting the main circuit.

FIG. 5 shows a block diagram of a conventional uninterruptible power-supply source (UPS) disclosed in Japanese Patent Publication (Laid-Open) No. HEISHEI-09-205740. Basically, this conventional UPS system drives a power converter 70 so as to cause a DC current available via an AC power-supply source 1 and another DC current available via a PWM (pulse-width modulation) converter 60 or another DC current directly available from a battery 6 via a DC switch 80 to respectively be converted into AC current consisting of a predetermined constant voltage and a constant frequency, before eventually supplying the constant AC voltage and frequency to external sources. Accordingly, it has been generally practiced to select a DC voltage output from the PWM converter 60 and also to select another DC voltage output from the battery 6 at a level substantially equal to each other. In FIG. 5, an illustration of a charging circuit is omitted.

The individual arms of the PWM converter consist of a diode and a switching element such as an IGBT (insulated gate bipolar transistor), for example, that are connected to the diode via an anti-parallel connection. Normally, an AC voltage is received from an AC power-supply source 1 via an input filter consisting of a main switch 21, a reactor 35, and a capacitor 33, and also via a boosting reactor 31, and the input AC voltage is then rectified into a DC voltage and boosted by the PWM converter 60. Finally, the boosted DC voltage is smoothed by a large-capacity electrolytic capacitor 4 before eventually being fed to a power converter 70. A series circuit comprising a charging switch 22 and a charging resistor 10 is connected to the main switch 21. All operations of the PWM converter 60 and the power converter 70 are individually controlled by a corresponding controlling unit 45. Corresponding controlling units are omitted in FIG. 5.

A startup-sequence controlling circuit 45 is provided so as to control the opening and closing operations of the charging switch 22 and a series switch 80, and also to control the startup of the PWM converter 60. When the main switch 21 and a DC switch 80 remain open and the power converter 70 remains OFF, upon receipt of a startup command and after the elapse of a predetermined delay time, the above controlling circuit 45 starts up operation of the PWM converter 60 to cause the DC voltage of the capacitor 4 to be boosted, and further causes the main switch 21 to be closed after the elapse of a predetermined delay time. By executing the above controlling operations, the capacitor 4 is enabled to implement an initial charging operation via a charging resistor without causing excessive rush current to flow therein.

In the conventional UPS circuit shown in FIG. 5, while the AC power-supply source 1 remains normal, the DC switch 80 remains open, whereas the main switch 21 is closed. AC voltage is received from the AC power-supply source 1 via the main switch 21 and an input filter. Next, the input AC voltage is converted into DC voltage by the PWM converter 60, and then smoothed by the capacitor 4. Then, the smoothed DC voltage is converted into AC current by the power converter 70 and, finally, the AC current is supplied to a load (not shown). In the event of the AC power-supply source 1 incurring a service interruption, as a means of avoiding instantaneous service interruption under a load by feeding a voltage stored in the capacitor 4, the controlling circuit 45 causes the DC switch 80 to be closed so as to ensure that an AC voltage will be transmitted to the power converter 70, thus achieving a system for effectively preventing instantaneous service interruption.

In the above circuit arrangement, in order to normally charge the capacitor 4 without causing an excessive rush current to flow therein when the charging operation is started, it is required to install a charging switch 22 and a charging resistor 10 in parallel with the main switch 21 disposed between the AC power-supply source 1 and an AC input filter of the PWM converter 60. It is further required to provide another startup sequence controlling circuit 45 for controlling those additional switches. This in turn necessitates the provision of an increased number of component parts, thus obstructing cost reduction and downsizing of the UPS unit. Further, as the level of the DC voltage stored in the battery 6 is substantially equal to that of the PWM converter 60, in the case of a conventional UPS system with a modest output capacity, the number of serial connections of the battery inevitably increases, thus adversely affecting the cost reduction and downsizing of the UPS system.

To solve the above problems, as cited in Japanese Patent Publication (Laid-Open) No. 2002-199620, there is a method of installing a pressure-adjustable chopper between a smoothing capacitor and a battery. According to this method, the pressure-adjustable chopper is operated so as to lower the voltage level in order to implement charging of the battery when the AC power-supply source remains normal. Conversely, when the AC power-supply source incurs a service interruption, the above chopper is operated so as to boost the voltage level, thereby boosting the voltage level of the battery to the voltage level concurrently output from the PWM converter 60. Accordingly, it is possible to select a low voltage for charging of the above battery. The previous art cited in Japanese Patent Publication (Laid-Open) No. 2002-199620 has also introduced the arrangement shown in FIG. 4 for implementation of the initial charging of the capacitor 4 when operation of the conventional UPS system is started.

In light of the above-described problems, it would be desirable to provide a power-converting apparatus featuring the ability to achieve initial charging of a smoothing capacitor generating a minimum rush current by obviating the need for additional series connections in a battery, and also obviating the need for an initial charging circuit consisting of a charging resistor and switch in the capacitor.

SUMMARY OF THE INVENTION

The present invention provides a power-converting apparatus featuring the ability to achieve initial charging of a smoothing capacitor generating a minimum rush current by obviating the need for additional series connections in a battery, and also obviating the need for an initial charging circuit consisting of a charging resistor and switch in the capacitor.

Specifically, the present invention provides a power-converting apparatus that, whenever variations in AC voltage input via an AC power-supply source remain within a predetermined range, holds an output AC voltage at a constant voltage level, wherein the power-converting apparatus comprises the following, a separating device that electrically separates an AC power-supply source from the input devices of the power-converting apparatus, an AC/AC converting circuit that initially rectifies AC current from an AC power-supply source and then causes a capacitor to smooth the rectified AC current, thereby converting the rectified AC current into DC current before again converting the DC current into AC current, a battery; and a DC/DC converting circuit that enables a capacitor to be charged with DC voltage delivered from the battery, and conversely enables the battery to be charged with a DC voltage delivered from the above capacitor bilaterally or unilaterally.

The present invention further provides a method of starting up the power-converting apparatus, which, upon receipt of a command for driving the power-converting system, while the separating device separates the AC power-supply source from the input terminals of the power converting apparatus, causes the above capacitor to be charged with DC voltage supplied from the battery up to a level substantially above the peak value of the AC power-supply source via the DC/DC converting circuit, and then causes the above separating device to connect the AC power-supply source to the input terminals of the power converting apparatus.

The present invention further provides an apparatus for actuating a power converter capable of holding an output AC voltage at a constant voltage whenever variation of an input voltage of AC power supply source remains within a predetermined range. The apparatus comprises: a separating means for electrically separating an AC power supply source from AC power being input to the power converter; an AC-AC converting circuit, which rectifies AC power of the AC power supply source and smoothens the rectified power into DC power via a capacitor and then converts the DC power into AC power; a battery; a DC-DC converting circuit, which enables the battery to charge the capacitor and, in reverse, the capacitor to charge the battery; and a chargeable voltage command arithmetic operation means, which determines a chargeable reserve voltage of the capacitor in response to an actual voltage of the AC power supply source. Upon receipt of an actuating command, while the separating means remains open, the DC-DC converting circuit charges the capacitor from the battery up to a chargeable reserve voltage predetermined by the chargeable voltage command arithmetic operation means, and then causes the separating means to be closed.

According to the present invention, whenever the power-converting apparatus is started, before the main switch is started, using a pressure-adjustable chopper disposed between the above smoothing capacitor and battery respectively disposed on the output side of the AC/DC converter, a controlling circuit causes the smoothing capacitor to be charged with a DC voltage supplied from the above battery, and then boosts the charged voltage to a level substantially above the peak value of the AC power-supply source, and finally causes the main switch to be turned ON. As a result, it is possible to use a smaller number of series connections on the part of the battery. Further, it is also possible to perform an initial charging of the smoothing capacitor that merely generates the minimum rush current without necessarily adding an initial charging circuit to this capacitor, which otherwise requires the additional provision of a charging resistor and a charging switch. Further, due to the decreased number of component parts, it is possible to realize cost reduction and downsizing of the power-converting apparatus.

BRIEF DESCRIPTION OF THE DRAWINGS

With the above as background, reference will now be made to the following detailed description of the preferred embodiments of the invention, wherein.

DETAILED DESCRIPTION OF THE PREFERRED EMBODIMENTS

Figure 1:
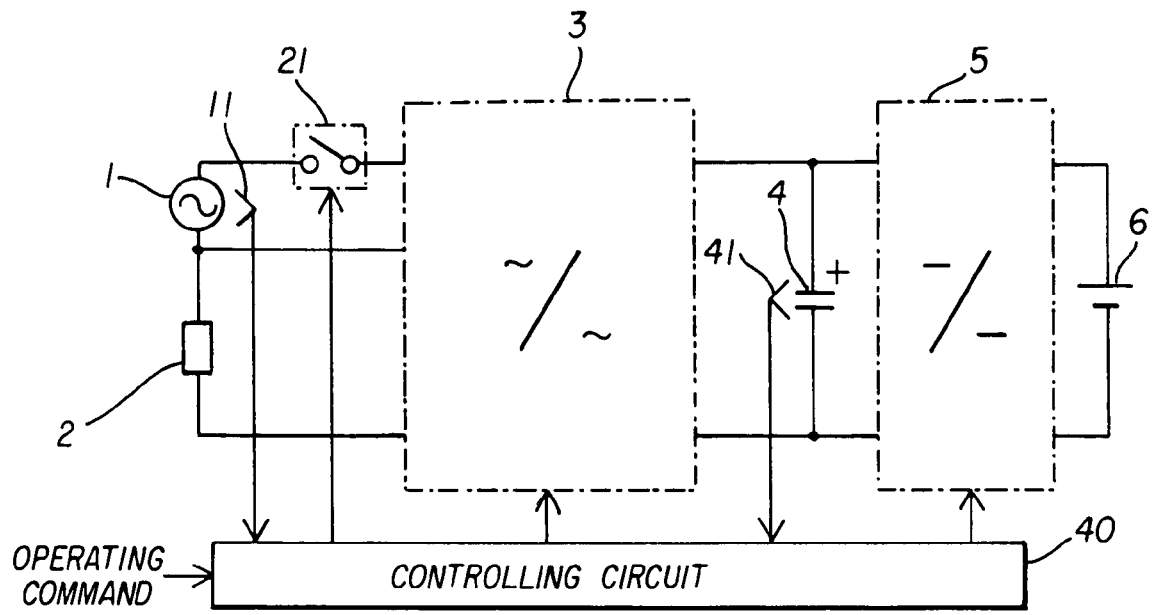
FIG. 1 is a schematic block diagram exemplifying the first practical form for implementing the present invention.

FIG. 1 presents a schematic block diagram of the power-converting apparatus according to the present invention. The power-converting apparatus includes an AC/AC converter 3 that initially receives AC voltage from an AC power-supply source 1 via a main switch 21 and then, after causing the input AC voltage to be smoothed by a capacitor 4 so as to convert the AC voltage into DC voltage, again converts the DC voltage into AC voltage, a load 2 that is connected between an output terminal of the AC/AC converter 3 and an end of the AC power-supply source 1, a DC/DC converter 5 that enables a battery 6 to be charged with DC voltage supplied from a capacitor 4, or conversely enables the capacitor 4 to be charged with a DC voltage supplied from the battery 6; and a controlling circuit 40 that initially receives an AC power-supply-source voltage detection signal from an AC power-supply-source voltage detector 11 and a DC voltage detection signal from an DC voltage detector 41, and then, based on an operating command signal, outputs an ON/OFF command signal and a drive signal to the main switch 21, the AC/AC converter 3, and the DC/DC converter 5.

Figure 2:
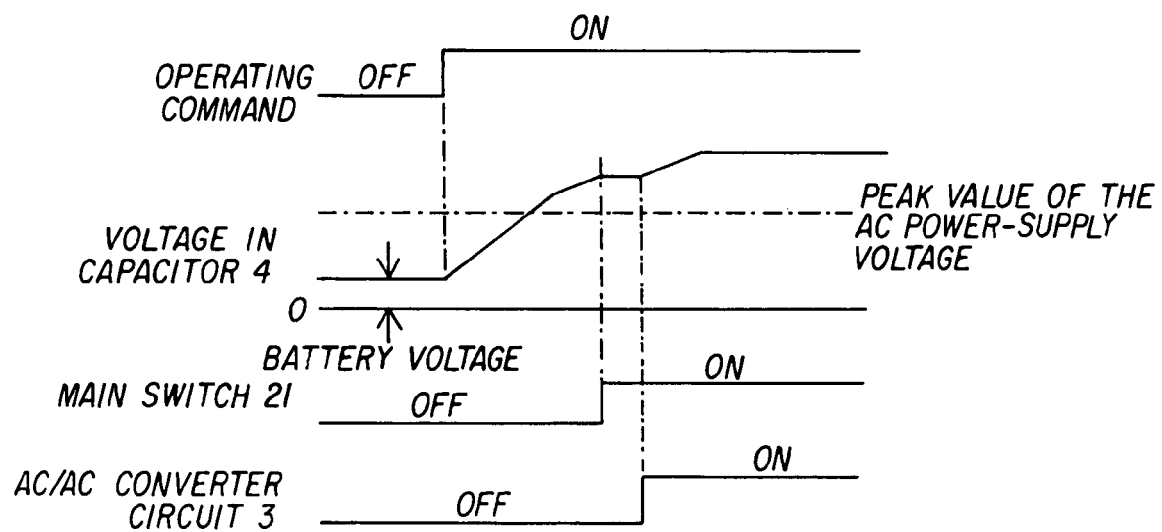
FIG. 2 is a flow diagram of the operating sequence of the power-converting apparatus according to the first embodiment of the present invention.

FIG. 2 presents a chart exemplifying the operating sequence. When an operating command signal is received by the controlling circuit 40, the DC/DC converter 5 commences operation and then, in response to a boosting operation, the capacitor 4 is gradually charged with DC voltage. As soon as the charged DC voltage has exceeded the peak value of the AC voltage of the AC power-supply source, the main switch 21 is turned ON. Thenceforth, after a predetermined length of time has elapsed, the AC/AC converter 3 is started. After these serial operations are performed, when the main switch 21 is turned ON, the DC voltage charged in the capacitor 4 actually exceeds the peak value of the AC power-supply source 1 and, accordingly, rush current for charging the capacitor 4 is prevented from flowing therein.

Figure 3:
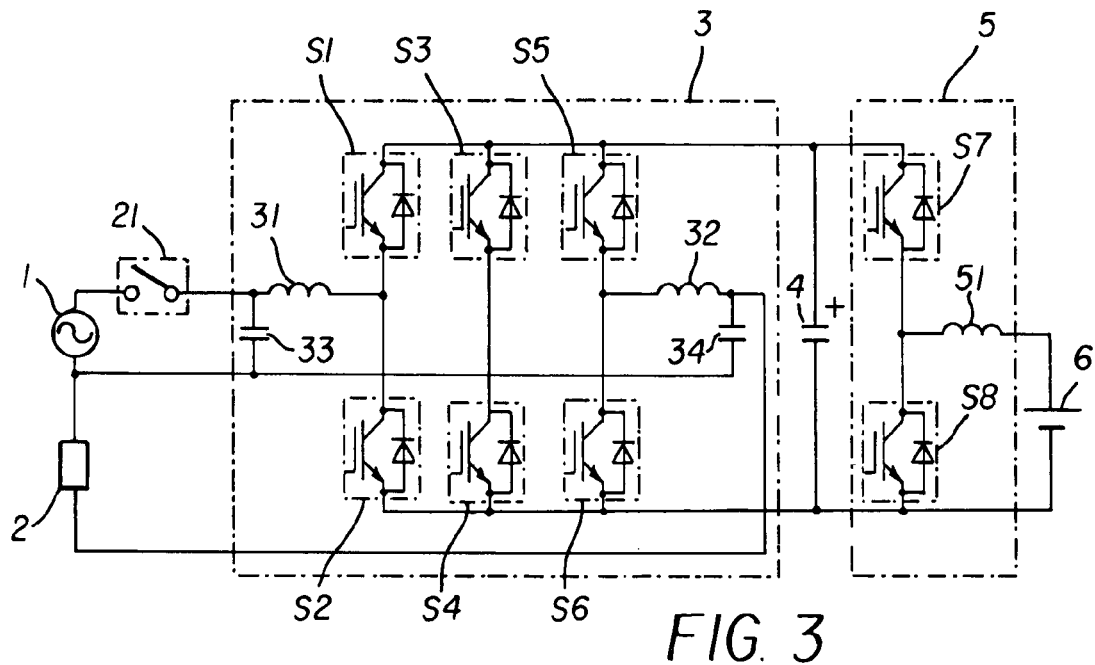
FIG. 3 is a detailed block diagram of the power-converting apparatus shown in FIG. 1.

FIG. 3 presents a detailed block diagram of the AC/AC converter circuit 3 and the DC/DC converter circuit 5. This block diagram was drawn with reference to the circuit diagram disclosed in Japanese Patent Publication (Laid-Open) No. 2002-199620 so as to be corresponded to the block diagram shown in FIG. 1. Using a plurality of semiconductor switching elements SI to S4, the AC/AC converter 3 executes AC/DC conversion, thereby causing the capacitor 4 to be charged with DC voltage. Using a plurality of semiconductor switching elements S3 to S6, the AC/AC converter 3 executes DC/AC conversion. The AC voltage is filtered or formed into small, distortion sine-waveform by using AC filters 32 and 34, which are eventually transmitted to a load 2. More specifically, the switching elements S1 to S4, with diodes connected to reverse in parallel, at as a rectifier to convert the alternating current output of the alternating current power supply 1, which passes through a filter comprising a capacitor 33 and inductor 31, to the direct current output. The direct current output is filtered by the smoothing capacitor 4.

The DC/DC converter 5, comprised of a pair of semiconductor switching elements S7 and S8 and a DC reactor 51, constitutes a voltage-adjustable chopper circuit. By causing the semiconductor switching element S7 to be turned ON and OFF, the battery 6 is charged with DC voltage. By causing the semiconductor switching element S8 to be turned ON and OFF, the DC voltage stored in the battery 6 is boosted to enable the capacitor 4 to be charged with the boosted DC voltage from the battery 6. More specifically, the switching elements S3 to S6, with diodes connected in reverse parallel, act as an inverter circuit to convert the direct current output to the stable alternating current output by PWM control. This alternating current output is supplied to the battery 6 via a filter comprising inductor 32 and capacitor 34. Switching elements S7 and S8, with diodes connected in reverse parallel, act as a chopper circuit and inductor 51 amplifies the direct current output of the battery 6 when alternating current power supply 1 is cut off. As a result, the direct current output of the battery 6 and the voltage of the smoothing capacitor are matched. Afterwards, the inverter circuit does PWM control on this end voltage and supplies power to the battery 6. Accordingly, even if the alternating current power supply 1 is cut off, power is supplied to the battery 6 continuously.

Figure 4:
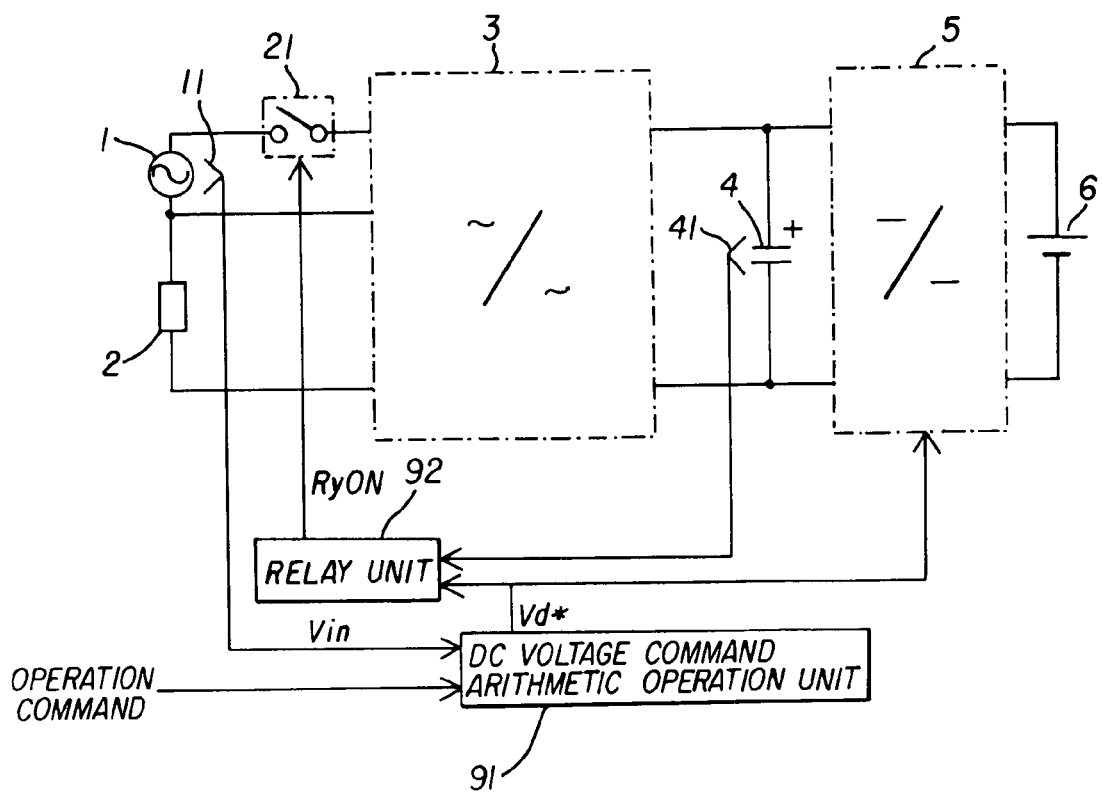
FIG. 4 is a schematic block diagram of an apparatus in accordance with a second embodiment of the invention.
Figure 5:
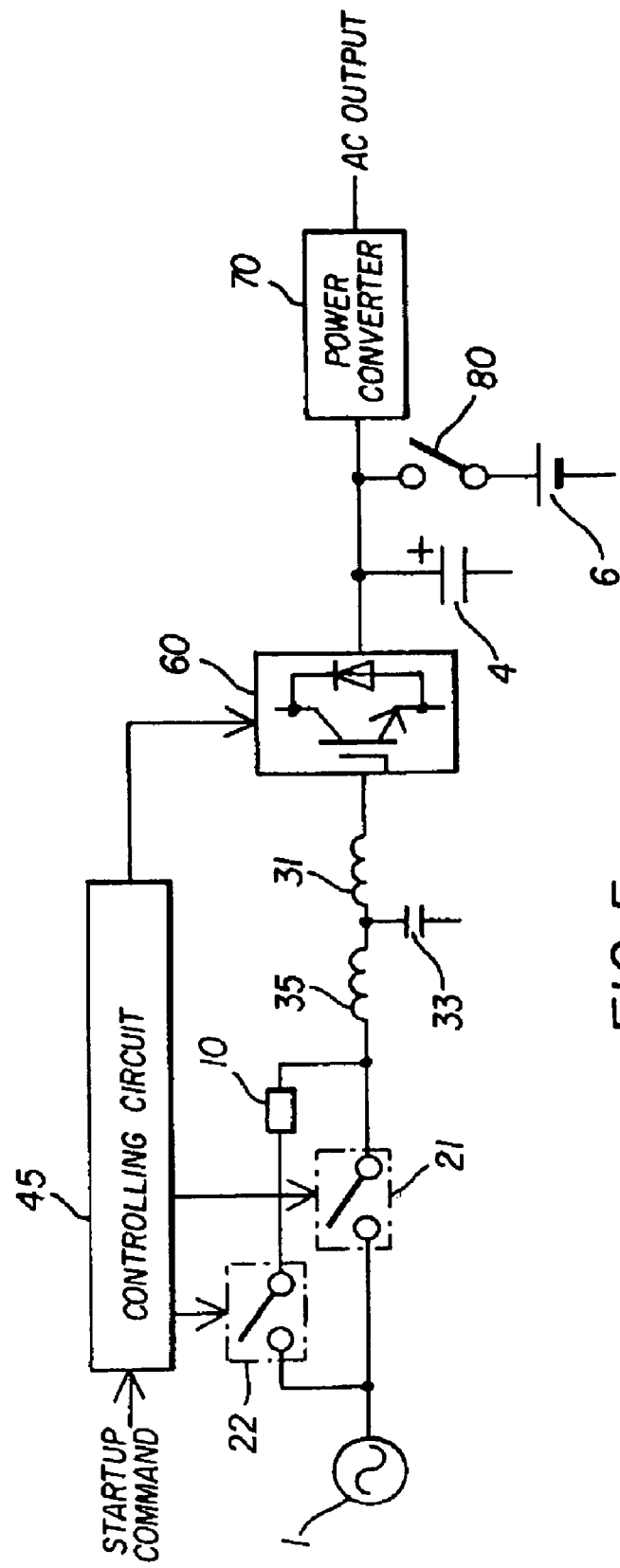
FIG. 5 is a block diagram of a conventional power-converting circuit.

FIG. 4 illustrates a second embodiment of the present invention. The main circuit components shown in FIG. 1 and FIG. 3 respectively comprise a structure identical to each other, in which identical component parts are respectively designated by identical reference numerals, thereby obviating further description thereof.

Upon the input of an operation command, based on an AC power supply source voltage Vin detected by an AC voltage detector 11, a DC voltage command arithmetic operation unit 91 outputs a DC voltage command Vd* that becomes a reserve charge completion level. The DC voltage command Vd* is computed in order that a voltage Vd of a capacitor 4 at a reserve charge completion will become a peak value of the AC power supply source voltage, for example. Then, the computed DC voltage command Vd* is input to a DC-DC converter 5 and a relay unit 92. Next, based on the DC voltage command Vd*, the DC-DC converter 5 executes a boosting operation, and then charges the capacitor 4 with DC power output from a battery 6. On the other hand, a relay unit 92 compares the capacitor voltage Vd detected by a DC voltage detector 41 to the DC voltage command Vd*, and then, if the voltage Vd of the capacitor 4 is found to be higher than the DC voltage command Vd*, the relay unit 92 judges that the reserve charge has been completed, and then outputs an ON command RyON to the main switch 21, thereby causing the main switch 21 to be turned ON.

As explained above in detail, upon determining the reserve charge completion level in correspondence with an actual voltage value of the AC power supply source, the capacitor 4 is charged up to a reserve charge completion level by operating the DC-DC converter 5 so as to cause the main switch 21 to be turned ON. As a result, even when the actual voltage of the AC power supply source varies, it is possible to prevent current surges from affecting the capacitor 4 at the moment of actuation operation of the power converter.

The power-converting apparatus according to an embodiment of the present invention incorporates a DC circuit comprising a large-capacity capacitor such as an electrolytic capacitor so as to execute serial processes for converting AC current into DC current and vice versa based on the AC power input via an AC power-supply source. The power-converting apparatus is further applicable to a variety of energy-accumulating means, including a power-converting apparatus equipped with a battery, a dual-layer electric capacitor, a fuel cell, or the like. The output means is compatible with AC current as well as DC current bilaterally.

What is claimed is:

1. A power-converting apparatus, capable of holding an output AC voltage at a constant voltage level when a variation in voltage input via an AC power-supply source remains within a predetermined range, the power-converting apparatus comprising:

separating means for electrically separating an AC power-supply source from input terminals of said power-converting apparatus;

a battery;

an AC/AC converting circuit;

a DC/DC converting circuit connected to the AC/AC converting circuit; and a capacitor connected to the AC/AC converting circuit and the DC/DC converting circuit, wherein said AC/AC converting circuit initially rectifies AC current input via said AC power-supply source and then causes said capacitor to smooth said rectified current to convert said AC current into DC current, and then further converts said DC current into AC current, wherein said DC/DC converting circuit enables said capacitor to be charged with a DC voltage delivered from said battery and further enables said battery to be charged with a DC voltage delivered from said capacitor, and wherein said DC/DC converting circuit charges said capacitor with said battery up to a voltage level substantially above the peak value of said AC power-supply source, while said AC power-supply source is electrically separated from the input terminals of said power-converting apparatus by said separating means, and wherein said AC power-supply source is electrically connected to the input terminals of said power-converting apparatus after said capacitor has been charged with said battery.

2. The apparatus according to claim 1, wherein said DC/DC converting circuit enables said capacitor to be charged with the DC voltage delivered from said battery and said battery to be charged with the DC voltage delivered from said capacitor bilaterally or unilaterally.

3. An apparatus for actuating a power converter capable of holding an output AC voltage at a constant voltage whenever variation of an input voltage of AC power supply source remains within a predetermined range, said apparatus comprising:

separating means for electrically separating an AC power supply source from AC power being input to said power converter;

a battery;

an AC-AC converting circuit;

a DC-DC converting circuit connected to the AC-AC converting circuit;

a capacitor connected to the AC-AC converting circuit and DC-DC converting circuit; and chargeable voltage command arithmetic operation means for determining a chargeable reserve voltage of said capacitor in response to an actual voltage of said AC power supply source, wherein said AC-AC converting circuit rectifies AC power of said AC power supply source, smoothes said rectified power into DC power via said capacitor, and then converts said DC power into AC power;

wherein said DC-DC converting circuit enables said battery to charge said capacitor and said capacitor to charge said battery, and wherein said DC-DC converting circuit charges said capacitor from said battery up to a chargeable reserve voltage predetermined by said chargeable voltage command arithmetic operation means, while said AC power-supply source is electrically separated from the input terminals of said power-converting apparatus by said separating means, and wherein said AC power-supply source is electrically connected to the input terminals of said power-converting apparatus after said capacitor has been charged with said battery.

4. A method of starting up a power-converting apparatus comprising the steps of:

providing a main switch for turning on and off an AC power-supply source to the power-converting apparatus;

providing a battery, an AC/AC converting circuit, a DC/DC converting circuit connected to the AC/AC converting circuit, and a capacitor connected to the AC/AC converting circuit and the DC/DC converting circuit;

initially rectifying AC current input via the AC power-supply source with the AC/AC converting circuit, smoothing the rectified current with the capacitor to convert the AC current into DC current, and then further converting the DC current into AC current with the AC/AC converting circuit;

enabling the DC/DC converting circuit to charge the capacitor with the battery or charge the battery with the capacitor;

charging the capacitor with the battery up to a voltage level substantially above the peak value of the AC power-supply source or up to a predetermined chargeable reserve voltage, while the main switch is turned off to cut off the AC power-supply source to the power-converting apparatus; and turning the main switch on to provide the AC power-supply source to the power-converting apparatus after charging the capacitor with the battery.

* * * * *